US012531756B2

United States Patent
Qian et al.

(10) Patent No.: US 12,531,756 B2
(45) Date of Patent: Jan. 20, 2026

(54) SESSION ESTABLISHMENT METHOD AND APPARATUS, ACCESS NETWORK DEVICE AND STORAGE MEDIUM

(71) Applicant: ZTE Corporation, Shenzhen (CN)

(72) Inventors: Chunyan Qian, Shenzhen (CN); Hui Xie, Shenzhen (CN); Lu Zhao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 172 days.

(21) Appl. No.: 18/029,429

(22) PCT Filed: Sep. 23, 2021

(86) PCT No.: PCT/CN2021/119919
§ 371 (c)(1),
(2) Date: Mar. 30, 2023

(87) PCT Pub. No.: WO2022/068669
PCT Pub. Date: Apr. 7, 2022

(65) Prior Publication Data
US 2023/0370292 A1    Nov. 16, 2023

(30) Foreign Application Priority Data
Sep. 30, 2020    (CN) .......................... 202011062979.7

(51) Int. Cl.
*H04L 12/06*    (2006.01)
*H04L 67/141*    (2022.01)
(52) U.S. Cl.
CPC ............ *H04L 12/06* (2013.01); *H04L 67/141* (2013.01)

(58) Field of Classification Search
CPC ..... H04L 12/06; H04L 67/141; H04L 63/205; H04L 67/14; H04L 65/00; H04L 65/1066;
(Continued)

(56) References Cited

U.S. PATENT DOCUMENTS 10,812,629 B2 *    10/2020    Park .................... H04W 8/08
2008/0076420 A1 *    3/2008    Khetawat ............ H04W 8/04
                                                              455/435.1
(Continued)

FOREIGN PATENT DOCUMENTS

CN    108400997 A    8/2018
CN    109104448 A    12/2018
(Continued)

OTHER PUBLICATIONS

European Search Report for corresponding application EP21874330; Mail date Feb. 23, 2024.
(Continued)

*Primary Examiner* — Michael Won
(74) *Attorney, Agent, or Firm* — CANTOR COLBURN LLP (57) ABSTRACT

The embodiments of the present disclosure relate to the technical field of network communications. Provided is a session establishment method applied to an access network device, comprising: receiving a session request of a UE, and sending the session request to a core network device; receiving a request response message returned by the core network device, wherein the request response message carries a session resource; initiating security activation of an access stratum to the UE; and after it is confirmed that the security activation is successful, sending the session resource to the UE for the UE to establish a session based on the session resource.

14 Claims, 5 Drawing Sheets

(58) Field of Classification Search
CPC ........... H04L 65/1101; H04L 29/06319; H04L 29/06326; H04L 29/08576; H04W 12/033; H04W 12/10; H04W 12/37; H04W 76/12; H04W 76/10; H04W 80/10; H04W 76/00
See application file for complete search history.

(56) References Cited

U.S. PATENT DOCUMENTS

| | | | |
|---|---|---|---|
| 2008/0311923 A1* | 12/2008 | Petrovic | H04W 76/12 455/450 |
| 2010/0088698 A1 | 4/2010 | Krishnamurthy | |
| 2014/0019575 A1* | 1/2014 | Alexander, Jr. | G06F 16/9535 709/213 |
| 2017/0187691 A1* | 6/2017 | Lee | H04L 63/205 |
| 2017/0202033 A1* | 7/2017 | Lee | H04W 8/22 |
| 2019/0274177 A1* | 9/2019 | Kuge | H04W 76/11 |
| 2020/0305118 A1* | 9/2020 | Ryu | H04W 76/10 |
| 2020/0323019 A1* | 10/2020 | Vargas | H04W 76/19 |
| 2021/0409940 A1* | 12/2021 | Wifvesson | H04L 9/0891 |
| 2022/0104306 A1* | 3/2022 | Shrestha | H04L 1/1812 |
| 2022/0132315 A1* | 4/2022 | Kolekar | H04W 12/106 |
| 2022/0174521 A1* | 6/2022 | Yao | H04L 43/10 |
| 2022/0182872 A1* | 6/2022 | John | H04W 28/0284 |
| 2024/0305980 A1* | 9/2024 | Ferdi | H04W 76/14 |

FOREIGN PATENT DOCUMENTS

| | | |
|---|---|---|
| CN | 109640324 A | 4/2019 |
| CN | 110351722 A | 10/2019 |
| CN | 110447252 A | 11/2019 |
| CN | 111052675 A | 4/2020 |
| EP | 3796694 A1 | 3/2021 |
| WO | 2018087696 A1 | 5/2018 |
| WO | 2018127190 A1 | 7/2018 |
| WO | 2020050138 A1 | 3/2020 |

OTHER PUBLICATIONS

PDU session related policy information, 3GPP TSG SA WG2 Meeting #135, Split, Croatia Oct. 14-18, 2019, S2-1909316.
Huawei, HiSilicon "Correction of security aspects in Registration and Service Request procedures", 3GPP TSG-SA2 Meeting #127, Sanya, China, Apr. 16-Apr. 20, S2-183795.
Huawei, HiSilicon, "TS 23.502: Update to PDU session establishment procedure and PDU session establishment authentication &authorization via the NEF", SA WG2 Meeting #122 Jun. 26-30, 2017, San Jose Del Cabo, Mexico, S2-174436.
International Search Report for corresponding application PCT/CN2021/119919 filed Sep. 23, 2021; Mail date Dec. 22, 2021.

* cited by examiner

SESSION ESTABLISHMENT METHOD AND APPARATUS, ACCESS NETWORK DEVICE AND STORAGE MEDIUM

CROSS-REFERENCE TO RELATED APPLICATION

The present disclosure is based upon and claims the benefit of priority to Chinese Patent Application No. 202011062979.7, filed on 30 Sep. 2020, the entire contents of which are incorporated herein by reference.

TECHNICAL FIELD

Embodiments of the present disclosure relate to the field of network communications technologies, and in particular, to a session establishment method and apparatus, an access network device and storage medium.

BACKGROUND

In a 5th Generation Mobile Communication Technology (5G) New Radio (NR) protocol stack, a process of establishing a session between user equipment (UE) and a network core network device is described in detail, which includes a process description of how a UE establishes a session and security activation.

In a session establishment process, a UE is required to send a session request to an access network device such as a base station, and the access network device allocates a session resource received from a core network device to the UE, and successfully establishes a session after performing secure activation with the UE, so that data interaction and service processing can be performed between the UE and the network core network device.

However, the session establishment technology has the following problems: if an access network device first allocates a session resource to a UE, and then performs security activation with the UE, after receiving the session resource, the UE initiates a next session request, which may cause a collision between the next session request sent by the UE and the security activation, resulting in a security activation failure, and further resulting in a session establishment failure.

SUMMARY

Embodiments of the present disclosure provide a session establishment method, which is applied to an access network device and includes: receiving a session request of a UE, and sending the session request to a core network device; receiving a request response message returned by a core network device; wherein the request response message carries a session resource; initiating security activation of an access stratum to a UE; and after it is confirmed that the security activation is successful, sending a session resource to a UE for the UE to establish a session based on the session resource.

An embodiment of the present disclosure also provides a session establishment apparatus, including: a request receiving module, configured to receive a session request of a UE; a forwarding module, configured to send a session request to a core network device; a response receiving module, configured to receive a request response message returned by a core network device; wherein the request response message carries session resources; a security activation module, which is used for initiating security activation of an access stratum to a UE; a sending module for sending a session resource to a UE after it is confirmed that security activation is successful, so that the UE establishes a session based on the session resource.

An embodiment of the present disclosure further provides an access network device, including: at least one processor; a memory communicatively coupled to the at least one processor; the memory stores an instruction executable by at least one processor, where the instruction is executable by the at least one processor, so that the at least one processor can execute the foregoing session establishment method.

An embodiment of the present disclosure also provides a computer readable storage medium, which stores a computer program, wherein the computer program implements the described session establishment method when being executed by a processor.

DETAILED DESCRIPTION OF THE EMBODIMENTS

Embodiments of the present disclosure mainly aim to propose a session establishment method and apparatus, access network device and storage medium, which can improve the success rate of session establishment.

To make the objectives, technical solutions, and advantages of the embodiments of the present disclosure clearer, the following describes each embodiment of the present disclosure in detail with reference to the accompanying drawings. However, a person of ordinary skill in the art may understand that, in the embodiments of the present disclosure, many technical details are put forward to help a reader understand the present disclosure better. However, even without these technical details and various changes and modifications based on the following embodiments, the claimed technical solutions of the present disclosure can be implemented. Dividing of the following embodiments is for convenience of description, and shall not constitute any limitation to specific implementations of the present disclosure. The embodiments may be referred to in combination with each other without any contradiction.

The first embodiment of the present disclosure relates to a session establishment method, which is applied to an access network device, and specifically includes: receiving a session request of a UE, and sending the session request to a core network device; receiving a request response message returned by a core network device; wherein the request response message carries session resources; initiating security activation of an access stratum to a UE; and after it is confirmed that the security activation is successful, sending a session resource to a UE for the UE to establish a session based on the session resource.

The session establishment method of the present embodiment is used for establishing a session between a UE and a core network device when a user using a mobile device accesses the network, thereby performing data interaction, so as to realize service processing on the UE. The session establishment method of the present embodiment can be realized by an access network device, such as a public mobile communication base station. The network scenarios where the CPE and the core network device are located may be network scenarios such as a single NR cell, a single core network, or a multi-core network. In wireless communications, an access network device is a network element structure of an Access Network (AN), and a radio access network (NG-RAN) may be formed by a gNB base station or an ng-eNB base station. When a User Equipment (UE) is in a connection management idle CM-IDLE state, a session request may be initiated to a core network device. When receiving a session request sent by a UE, a base station sends the session request to a core network device providing a network service for a UE. For example, it is a functional entity for an operator to implement Access and Mobility Management Function (AMF), when receiving a session resource sent by an AMF, a base station firstly performs security activation with a UE, and after the security activation succeeds, allocating a session resource to a UE, completing a session establishment between the UE and a core network device, and realizing a session connection service between the UE and the core network device. At this time, the UE enters a connection management connection CM-CONNECTED state. With the evolution of the 5G protocol, when the UE is in the CM-CONNECTED state and there is no NAS procedure currently, the UE may also initiate a session request to request the AMF to restore the user plane resources of the session. The NAS process is a process of mobility management and session management between a UE and a Mobility Management Entity (MME). If the base station first performs security activation with the UE, and after the security activation succeeds, the session resources are allocated to the UE, so that session recovery failure caused by collision between an NAS process in which the UE initiates a session request and a security activation process, and security failure caused by collision between a Service Request process in a CM-CONNECTED state and a security activation caused by triggering the Access stratum (AS) by a Service Request process in a CM-IDLE state can be avoided, thereby ensuring the establishment of a session.

Figure 1:
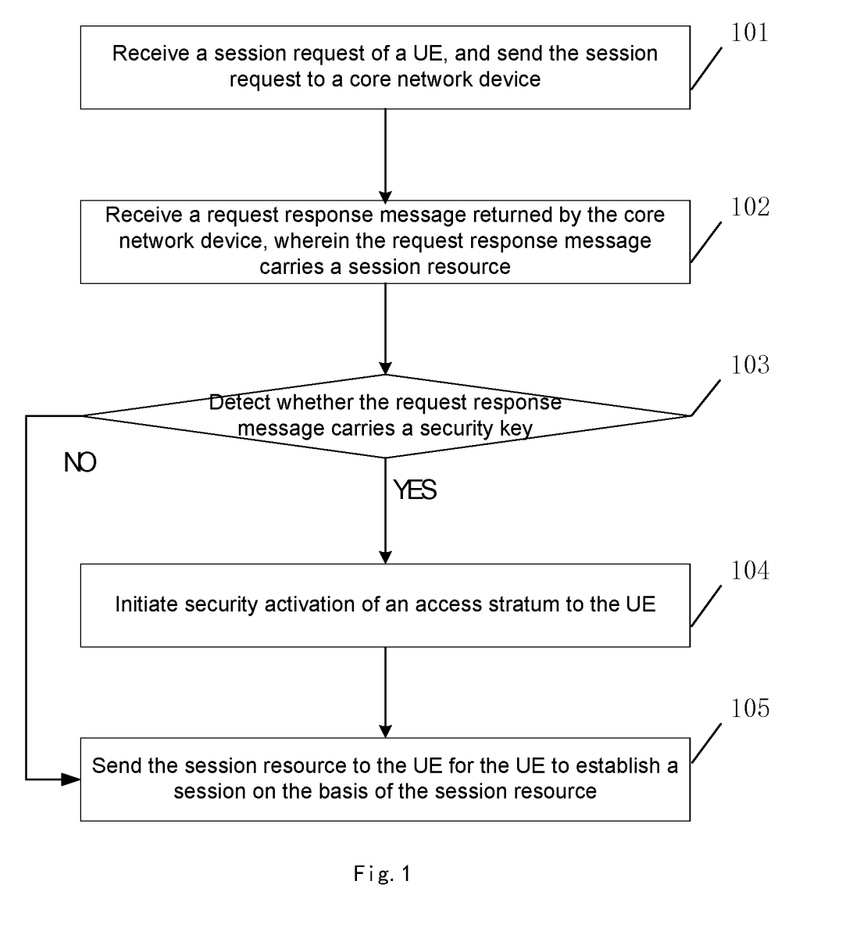
FIG. 1 is a flowchart of a method for establishing a session according to a first embodiment of the present disclosure.

The implementation details of the method for establishing a session in this embodiment are described in detail in the following. The following content is only for ease of understanding the provided implementation details, and is not a requirement for implementing this solution. Specifically, as shown in FIG. 1:

At Step 101, a base station receives a session request sent by a UE, where the session request may be a session setup request, a session recovery request, or the like. A UE may send a session request to a base station in the form of a message, and the base station encapsulates the session request and then sends same to a core network device, such as an AMF. Specifically, the session may be a Protocol Data Unit (PDU) session, and the PDU session establishment request is used for requesting to initiate a PDU session to a core network device such as an AMF, so as to establish a connection between a UE and the core network device for communication; the session resume request is used to request the core network device to resume a previously established but unused session. The base station encapsulates the PDU session request into an Initial UE Message, and sends same to a core network device via an N2 interface. One UE may establish a plurality of PDU sessions, and information about one PDU session may include relevant information such as a user number, a mobile subscriber identity (IMSI), an international mobile equipment identity (IMEI), user location information, and a PDU session ID. PDU session ID is used for identifying the ID of the PDU session to be established, the ID is unique for each UE, and the use range of the ID number is limited to this UE. If the UE sends a session recovery request, before the base station receives the session request sent by the UE, the base station, the UE, and the core network device need to perform an initial access process to establish a PDU session.

At Step 102, the base station receives, through the N2 interface, a request response message returned by the core network device, where the request response message includes a processing result obtained after the core network device performs response processing on the session request of the UE. Specifically, the processing result may be a request acceptance or a request denial. If the core network device accepts the request, the core network device selects a Session Management Function (SMF) entity for the UE initiating the session request to perform policy control on the session, allocates an IP address to the UE, and carries these processing results as session resources in an initial context setup request INITIAL CONTEXT SETUP REQUEST message, and returns the message to the base station as a request response message. The base station receives the request response message returned by the core network device, and obtains the session resources from the response message.

At Step 103, the base station detects whether there is a security key field in the received request response message, so as to confirm whether the request response message carries a security key. If the base station detects that the request response message carries the security key, then initiating AS security activation to the UE, so as to encrypt and integrity protect the data transmission of the access stratum, i.e. executing Step 104; if the request response message does not carry the security key, the access stratum data transmission is not encrypted and integrity protected, and the base station directly sends the session resource to the UE, that is, the AS security activation in Step 104 is not performed, and Step 105 is directly performed.

If the base station detects that the request response message carries the security key, the session resource extracted from the request response message is stored in the cache area, and after the access stratum completes the security activation, the session resource stored in the cache area is sent to the UE.

At Step 104, the base station initiates the AS security activation of the access stratum to the UE so as to ensure the transmission security of the control plane Radio Resource Control (RRC) message and the user plane data packet between the base station and the UE, that is, the AS security includes the integrity protection of the RRC signaling and the encryption of the RRC information and the user data. When the AS is security activated, a signaling connection is established between the base station and the UE, and then the encryption algorithm and integrity protection are activated and configured with the UE.

Specifically, the AS security activation may be performed by a base station by means of sending a security activation command to a UE, wherein the security activation command includes an AS Security Mode Command (SMC) message. A base station sends an AS SMC message to a UE; and if the UE confirms that AS security activation is performed, the base station will receive an AS SMC complete message replied by the UE. The AS SMC message should include the RRC and UP encryption and integrity algorithms selected by the base station for the UE. The AS SMC complete message should be integrity protected using the selected RRC algorithm indicated in the AS SMC message. After sending an AS SMC message, a base station may perform RRC downlink encryption, and after receiving and successfully verifying an AS SMC complete message, the base station may perform RRC uplink decryption; after sending the AS SMC complete message, the UE may perform RRC uplink ciphering, i.e., the AS layer security activation is successful.

In an example, the AS security activation initiated by the base station to the UE include configuring a Data Radio Bearer (DRB) for the session and performing negotiation of AS layer security parameters. Specifically, during AS security activation, a base station negotiates with a UE to select an AS integrity protection and encryption algorithm, and sends an RRC connection configuration message to the UE for performing UP integrity protection and UP encryption activation on a DRB, so that data transmission between the base station and the UE is encrypted and integrity protected. Since the activation of the UP integrity protection and the UP encryption is performed for the DRB, the DRB data traffic between the base station and the UE can be completely encrypted and protected.

In an example, after the base station determines that the security activation succeeds, the base station further determines whether a session resource exists in the cache area; if the session resource exists in the cache area, the base station sends the session resource to the UE; and if no session resource exists in the cache area, the base station directly returns a request response acknowledgement message to the core network device.

At Step 105, when the base station receives a response of the UE sending the AS SMC complete message and confirms that the AS security activation is successful, the base station encrypts the session resource in the cache region acquired from the request response message and sends same to the UE, and the UE uses the received session resource to connect to a core network device; alternatively, when detecting that the request response message does not carry the security key, the base station directly sends the session resource carried in the request response message to the UE, so that the UE can successfully establish a PDU session between the UE and the core network device based on the received session resource.

In an example, after allocating the session resources to the UE, the base station returns a request response acknowledgement message to the core network device, so as to prompt the core network that the session resources allocated to the UE by the core network have been sent out, and before the session ends, the session resources cannot be allocated to other sessions again.

In an example, a UE initially accesses a network, establishes a PDU session, and does not transmit service data, an access network node device (NG-RAN node) notifies a UE to enter a CM-IDLE state, and when the UE has a service needing to be uploaded, a Service Request is initiated to the NG-RAN node. The NG-RAN node sends the Service Request to the core network device AMF in the initial UE information, and if the AMF determines that the PDU session needs to be recovered, carry the session resources in a request response message and send same to the NG-RAN node, and the NG-RAN node initiates security activation to the UE. After successful security activation, the session resources carried in the request response message are sent to the UE. Since the security of this PDU session has been activated, the service Request of the next PDU session and the AS security mode SMC command of this security activation will not collide.

In an example, a UE initially accesses a network, establishes a plurality of PDU sessions, and does not transmit service data, the NG-RAN node notifies the UE to enter a CM-IDLE state, and when the UE performs service processing on one PDU session therein, a Service Request for returning to the IDLE state is initiated. The NG-RAN node sends the Service Request to the core network device AMF in the initial UE information, and if the AMF determines that the PDU session needs to be recovered, carry the session resources in a request response message and send same to the NG-RAN node, and the NG-RAN node initiates security activation to the UE. After successful security activation, the session resources carried in the request response message are sent to the UE. In this case, if the UE performs service processing on another PDU session, the UE then initiates a service Request in a connected state, and since the security of the previous PDU session has been activated, the service Request in the connected state and the AS security mode SMC command message of the security activation will not conflict.

Figure 2:
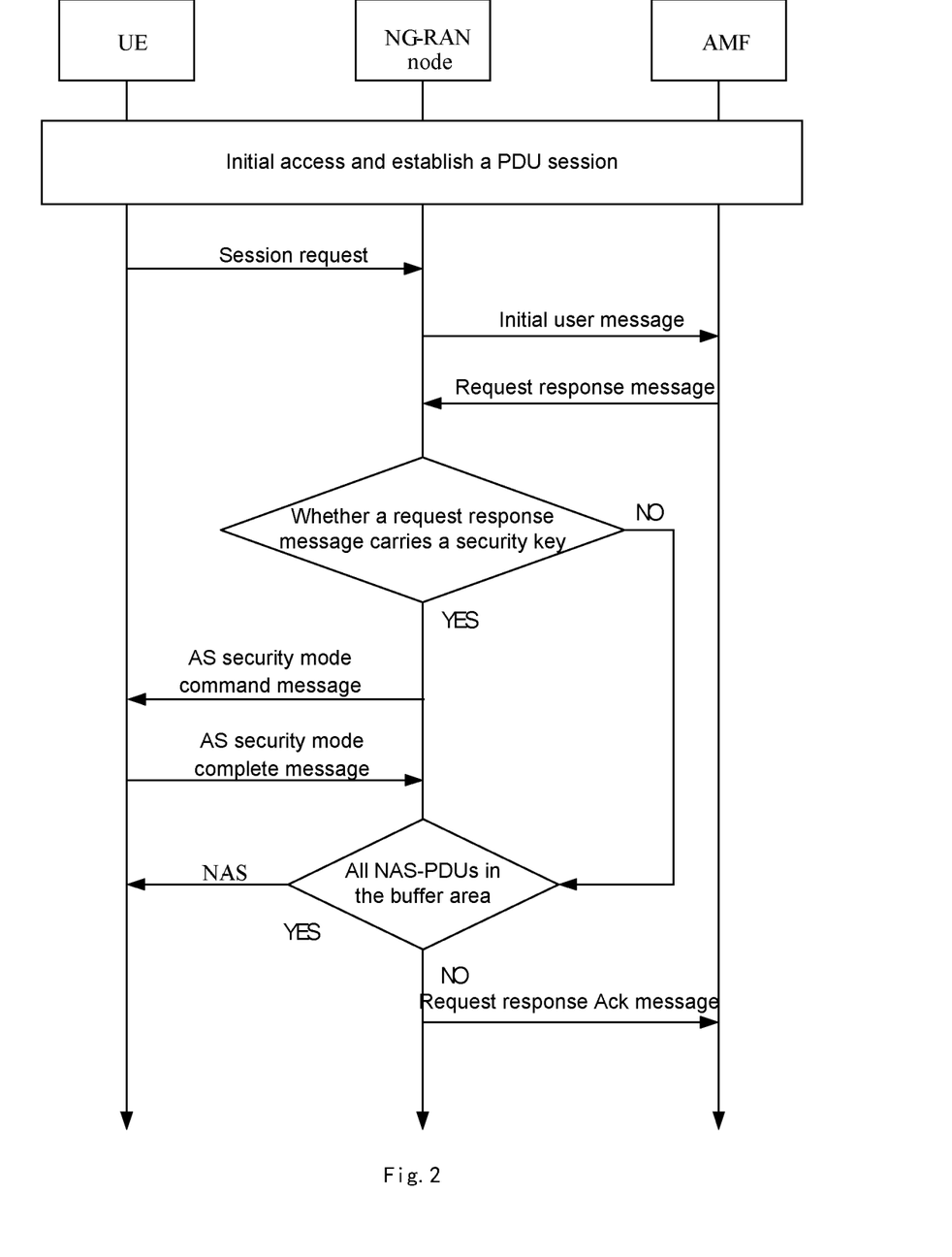
FIG. 2 is an interaction flowchart of a session establishing method according to a first embodiment of the present disclosure.

In an example, a session setup procedure is shown in FIG. 2. In this embodiment, one PDU session established during initial access of a UE is restored. A UE sends a session request Service Request to an access network device NG-RAN node; and after receiving the Service Request, the NG-RAN node encapsulates same in an initial user message Initial UE Message and sends same to a core network device AMF. After receiving the Initial UE Message, the AMF sends a request response message N2 Request to the NG-RAN node from the N2 interface, acquires a session resource NAS-PDU from the received N2 Request according to the received N2 Request, and stores same in a cache region; the NG-RAN node further judges the N2 Request; and if the N2 Request carries a Security Key, an AS security mode command Security Mode Command is sent to the UE according to the security key. The UE receives the AS Security Mode Command and replies to the NG-RAN node with an AS security mode complete message, the NG-RAN node receives the AS Security Mode Complete, and the AS layer security activation is completed; if the N2 Request does not carry the Security Key, the AS security activation process is skipped. The NG-RAN node judges whether there is an NAS-PDU in the buffer region, if so, sends the NAS-PDU to the UE, and judges again whether there is no in the buffer region, and returns a request response acknowledgement message N2 Request Ack to the AMF via the N2 interface.

In this embodiment, a session request of a user is received, the session request is sent to a core network device, and a request response message returned by the core network device is received, initiating security activation to a UE, and after it is confirmed that the security activation is successful, allocating a session resource carried in a request response message to the UE. Because the session resources are allocated after the session resources are activated safely before the session resources are allocated to the UE. That is, during the security activation process, the user does not end the session setup procedure, and will not initiate the next session request. Thus, the situation that the security activation conflicts with the next session request is avoided, and the session cannot be established successfully. Therefore, the method for establishing a session according to the present disclosure can improve the success rate of establishing a session between the UE and the core network device.

The step division of the above various methods is only for the purpose of clear description, and during implementation, the methods may be combined into one step or some steps may be divided into a plurality of steps, and all the steps are within the scope of protection of the present patent as long as they include the same logic relationship; it is within the scope of protection of the patent to add insignificant modifications to or introduce insignificant designs into the algorithms or flows, but not to change the core design of the algorithms and flows.

The second embodiment of the present disclosure relates to a method for establishing a session. The second embodiment is substantially the same as the first embodiment, and the main difference lies in that, in the second embodiment of the present disclosure, the security key is carried in the request response message.

Figure 3:
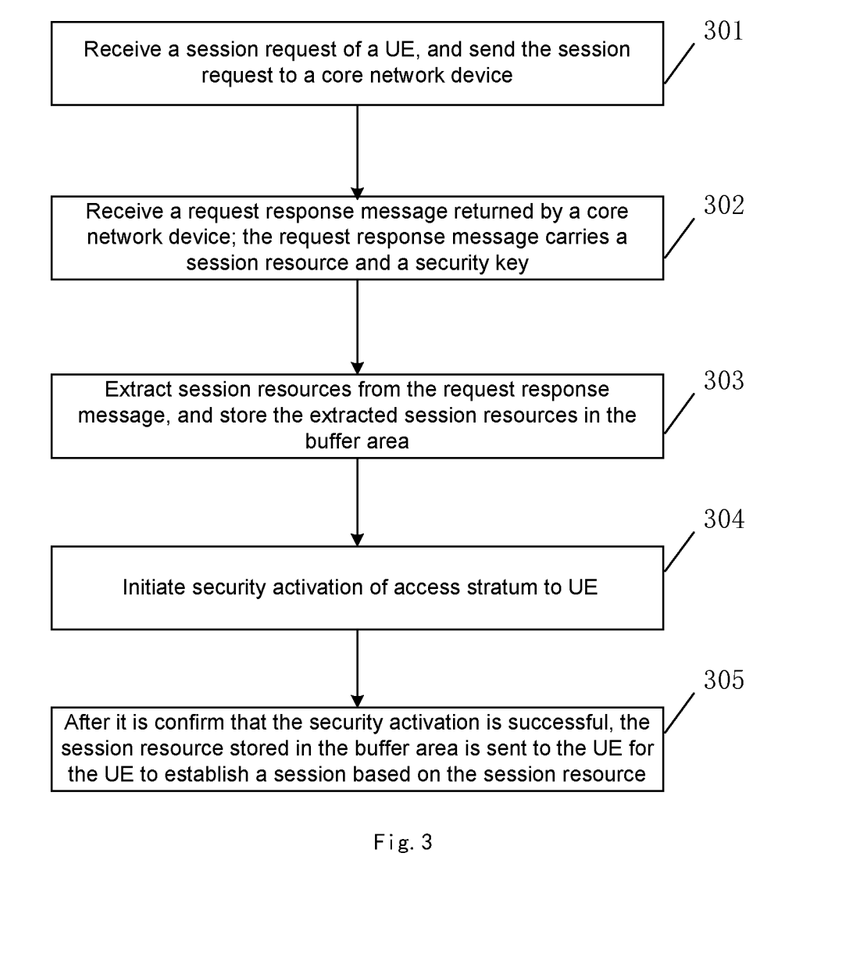
FIG. 3 is a flowchart of a method for establishing a session according to a second embodiment of the present disclosure.

The specific process of this embodiment is shown in FIG. 3.

Step 301, receiving a session request of a UE, and sending the session request to a core network device;

Step 302, receiving a request response message returned by a core network device; wherein the request response message carries a session resource and a security key;

Step 303, session resources are extracted from the request response message, and the extracted session resources are stored in the cache area;

Step 304, initiating security activation of an access stratum to a UE;

Step 305, after it is determined that the security activation is successful, the session resources stored in the cache area are sent to the UE for the UE to establish a session based on the session resources.

Steps 301 and 304 are substantially the same as Steps 101 and 104 in the first embodiment, and are not further described.

At Step 302, the request response message carries the security key, wherein the core network device sends the security key to the base station in the context setup request message. Specifically, the base station may select an RRC and UP encryption and integrity protection algorithm for the UE according to the security key, and indicate in the AS security mode command the selected RRC and UP encryption and integrity algorithm for the UE to perform security activation.

At Step 303, the base station stores the session resource extracted from the request response message in a buffer area, wherein the buffer area may be a storage area dedicated to storing session resources in the base station, or a storage area capable of storing other communication resources.

At Step 305, after the base station determines that the security activation is successful, the data transmission between AS layers is encrypted and integrity protected, and the base station may encrypt the session resources stored in the cache area and send same to the UE to establish an AS layer secure communication session.

In an example, the session request sent by the UE further carries a request identification value for identifying the session request, and the security activation command sent by the base station to the user also carries the same request identification value, so that the UE confirms that the security activation command sent by the base station is a security activation command for the session request corresponding to the request identification. Specifically, the request identifier value may be a NAS uplink COUNTS value, and the NAS uplink COUNTS value is also used in the security key carried in the request response message sent by the core network device. After receiving the security activation command sent by the base station, the UE verifies whether the NAS uplink COUNTS value carried in the security activation command is consistent with the NAS uplink COUNTS value of the session requested by the UE, and if they are consistent, the UE performs security activation, and if they are inconsistent, the security activation fails.

Figure 4:
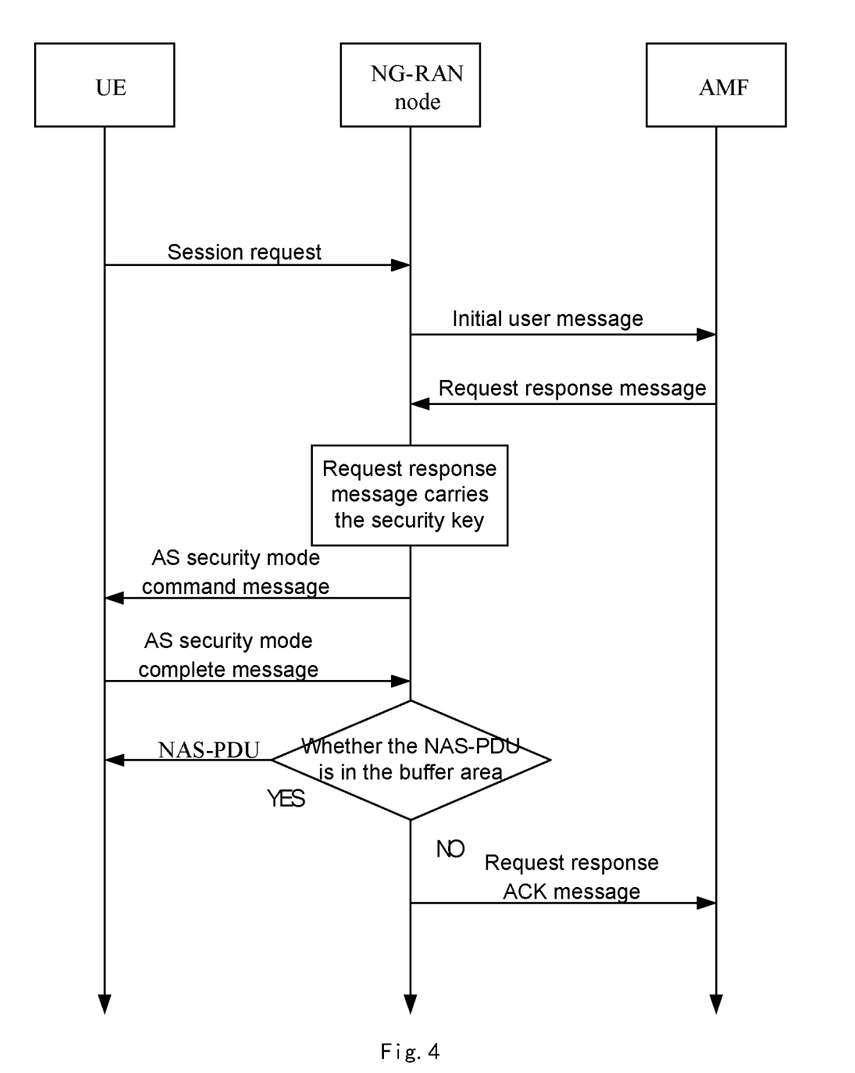
FIG. 4 is an interaction flowchart of a method for establishing a session according to a second embodiment of the disclosure.

In an example, a session setup procedure is as shown in FIG. 4, a user equipment UE sends a session request Service Request to an access network device NG-RAN node, and after receiving the Service Request, the NG-RAN node encapsulates the Service Request into an Initial UE Message and sends the Initial UE Message to a core network device AMF. After receiving the Initial UE Message, the AMF sends a request response message N2 Request carrying the security key Security Key to the NG-RAN node via the N2 interface. The NG-RAN node obtains the Security Key and the session resource NAS-PDU according to the received N2 Request, and stores the NAS-PDU in the buffer area. The NG-RAN node sends an AS security mode command, Security Mode Command, to the UE according to the Security Key; the UE receives the AS Security Mode Command and replies with an AS security mode complete message, Security Mode Complete, to the NG-RAN node; the NG-RAN node receives the AS Security Mode Complete; and the AS layer security activation is completed. The NG-RAN node judges whether there is an NAS-PDU in the buffer region, and if so, sends the NAS-PDU to the UE, and returns a request response acknowledgement message N2 Request Ack to the AMF via the N2 interface.

In this embodiment, a session resource is first stored in a cache area, and after the security activation succeeds, the session resource is sent to a UE, thereby implementing the security activation performed with the UE first, and then the session resource is allocated to the UE, avoiding the situation where the security activation conflicts with the next session request, and improving the session establishment success rate between the UE and a core network device.

The step division of the above various methods is only for the purpose of clear description, and during implementation, the methods may be combined into one step or some steps may be divided into a plurality of steps, and all the steps are within the scope of protection of the present patent as long as they include the same logic relationship; it is within the scope of protection of the patent to add insignificant modifications to or introduce insignificant designs into the algorithms or flows, but not to change the core design of the algorithms and flows.

Figure 5:
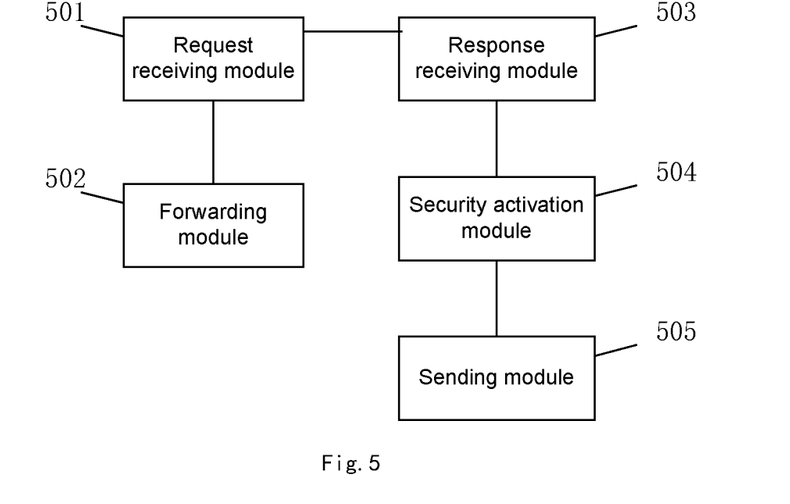
FIG. 5 is a schematic structural diagram of an apparatus for establishing a session according to a third embodiment of the present disclosure.

A third embodiment of the present disclosure relates to an apparatus for establishing a session. The specific structure is shown in FIG. 5.

A request receiving module 501, configured to receive a session request from a UE;

A forwarding module 502, configured to send the session request to a core network device;

A response receiving module 503, configured to receive a request response message returned by the core network device; wherein the request response message carries session resources;

A security activation module 504, configured to initiate security activation of an access stratum to a UE;

And a sending module 505, which sends the session resource to the UE after it is confirmed that the security activation is successful, for the UE to establish a session based on the session resource.

Further, the response receiving module 503 is further configured to, after the response receiving module 503 receives the request response message returned by the core network device and before the security activation module 504 initiates the security activation of the access stratum to the UE, detect whether the request response message carries the security key. If the response receiving module 503 detects that the request response message carries the security key, the response receiving module 503 notifies the security activation module 504 to initiate the security activation; if the response receiving module 503 detects that the request response message does not carry the security key, the response receiving module 503 notifies the sending module 505 to directly send the session resource to the UE.

Further, the session setup apparatus further includes a buffering module 506, configured to store the session resources extracted from the request response message.

Further, when detecting that the request response message carries the security key, before the security activation module 504 initiates the security activation of the access stratum to the UE, the response receiving module 503 extracts the session resources from the request response message, and stores the extracted session resources in the buffering module 506. The sending module 505 is further configured to send the session resources stored in the buffering module 506 to the UE.

Further, the request response message carries a security key, and the response receiving module 503 is further configured to extract session resources from the request response message and store the extracted session resources in the buffering module 506.

Further, the security activation module 504 is further configured to send a security activation command to the UE based on the security key.

Further, the session request carries a request identification value for identifying the session request, and the security activation module 504 is further configured to send a security activation command carrying the request identification value for the user to confirm that the security activation command is a command for the session request.

Further, the response receiving module 503 is further configured to return a response acknowledgement request message to the core network device.

It is easily found that this embodiment is a device embodiment corresponding to the foregoing method embodiment, and this embodiment may be implemented in cooperation with the foregoing embodiments. Details of the related art mentioned in the foregoing embodiments are still valid in this embodiment, and are not described herein again to reduce repetition. Correspondingly, the related technical details mentioned in this embodiment may also be applied in the above embodiments.

It should be noted that all modules involved in this embodiment are logic modules. In a practical application, one logic unit may be one physical unit or a part of one physical unit, and may also be implemented by using a combination of a plurality of physical units. In addition, in order to highlight the innovation part of the present disclosure, the present embodiment does not introduce units less closely related to solving the technical problem proposed in the present disclosure, but this does not indicate that other units do not exist in the present embodiment.

Figure 6:
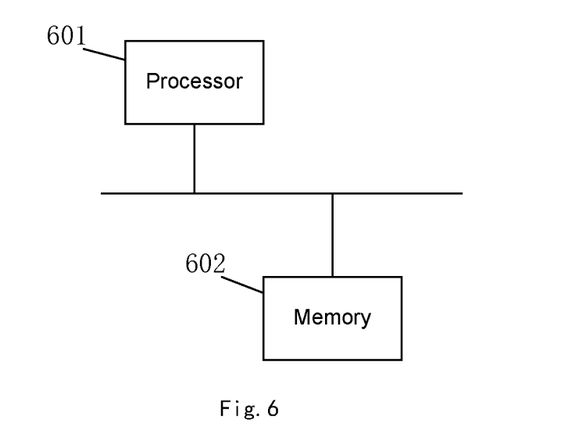
FIG. 6 is a schematic diagram of an access network device according to a fourth embodiment of the present disclosure.

A fourth embodiment of the present disclosure relates to an access network device. As shown in FIG. 6, the access network device includes: at least one processor 601; a memory 602 communicatively coupled to the at least one processor; the memory 602 stores an instruction that can be executed by the at least one processor 601, where the instruction is used by the at least one processor 601 to execute the foregoing session establishment method.

The memory 602 and the processor 601 are connected in a bus manner, the bus may include any number of interconnected buses and bridges, and the bus connects various circuits of the one or more processors 601 and the memory 602 together. The bus may also connect a variety of other circuits, such as peripheral devices, voltage regulators, and power management circuitry, which are well known in the art and therefore are not described further herein. The bus interface provides an interface between the bus and the transceiver. A transceiver may be one element or multiple elements, such as multiple receivers and transmitters that provide a means for communicating with various other devices over a transmission medium. Information processed by the processor 601 is transmitted on a wireless medium through an antenna, and further, the antenna receives the information and transmits the information to the processor 601.

The processor 601 is responsible for managing a bus and general processing, and can further provide various functions, including timing, peripheral interfaces, voltage regulation, power management, and other control functions. And memory 602 may be used to store information used by processors in performing operations.

A fifth embodiment of the present disclosure relates to a computer readable storage medium, which stores a computer program. The computer program implements the foregoing method embodiments when being executed by a processor.

That is, a person skilled in the art may understand that all or a part of the steps of the methods in the foregoing embodiments may be implemented by a program instructing relevant hardware. The program is stored in a storage medium and includes several instructions for instructing a device (which may be a single chip, a chip, or the like) or a processor to execute all or a part of the steps of the methods in the embodiments of the present disclosure. The foregoing storage medium includes: any medium that can store program codes, such as a USB flash disk, a removable hard disk, a Read-Only Memory (ROM), a Random Access Memory (RAM), a magnetic disk, or an optical disk.

The ordinary skilled person in the art may understand that the foregoing embodiments are specific embodiments for implementing the present disclosure, and in practical applications, various changes may be made in form and details without departing from the spirit and scope of the present disclosure.

What is claimed is:

1. A session establishment method, applied to an access network device, comprising:
   receiving a session request of a user equipment (UE), and sending the session request to a core network device;
   receiving a request response message returned by the core network device; wherein the request response message carries a session resource and a security key, and the session resource comprises an IP address allocated by the core network device to the UE and a Session Management Function (SMF) selected by the core network device for the UE;
   extracting the session resource from the request response message, and storing the extracted session resource in a cache area; extracting the security key from the request response message, and initiating security activation of an access stratum to the UE based on the security key; and after confirming that the security activation is successful, sending the session resource stored in the cache area to the UE so that the UE establishes a session based on the session resource;

wherein initiating security activation of an access stratum to the UE comprises: configuring a Data Radio Bearer (DRB) for the session and performing negotiation of access stratum security parameters.

2. The session establishment method according to claim 1, wherein after receiving a request response message returned by the core network device and before initiating security activation of an access stratum to the UE, the method further comprises:

detecting whether the request response message carries a security key;

when the request response message carries the security key, then executing the step of initiating the security activation of the access stratum to the UE; when the request response message does not carry the security key, directly sending the session resource to the UE.

3. The session establishment method according to claim 2, wherein the step of initiating the security activation of an access stratum to the UE comprises:

sending a security activation command to the UE based on the security key.

4. The session establishment method according to claim 3, wherein the session request carries a request identification value for identifying the session request;

the security activation command carries the request identification value so that the UE can confirm that the security activation command is a command for the session request.

5. An access network device, comprising:
at least one processor;
a memory communicatively coupled to the at least one processor;
the memory stores an instruction executable by the at least one processor, wherein the instruction is executed by the at least one processor, so that the at least one processor execute the session establishment method according to claim 4.

6. An access network device, comprising:
at least one processor;
a memory communicatively coupled to the at least one processor;
the memory stores an instruction executable by the at least one processor, wherein the instruction is executed by the at least one processor, so that the at least one processor execute the session establishment method according to claim 3.

7. An access network device, comprising:
at least one processor;
a memory communicatively coupled to the at least one processor;
the memory stores an instruction executable by the at least one processor, wherein the instruction is executed by the at least one processor, so that the at least one processor execute the session establishment method according to claim 2.

8. A non-transitory computer readable storage medium, storing a computer program, wherein when the computer program is executed by a processor, to perform the session establishment method as claimed in claim 2.

9. The session establishment method according to claim 1, wherein after sending the session resource to the UE, the method further comprises:

returning a request response acknowledgement message to the core network device.

10. An access network device, comprising:
at least one processor;
a memory communicatively coupled to the at least one processor;
the memory stores an instruction executable by the at least one processor, wherein the instruction is executed by the at least one processor, so that the at least one processor execute the session establishment method according to claim 9.

11. A non-transitory computer readable storage medium, storing a computer program, wherein when the computer program is executed by a processor, to perform the session establishment method as claimed in claim 9.

12. An access network device, comprising:
at least one processor;
a memory communicatively coupled to the at least one processor;
the memory stores an instruction executable by the at least one processor, wherein the instruction is executed by the at least one processor, so that the at least one processor execute the session establishment method according to claim 1.

13. A non-transitory computer readable storage medium, storing a computer program, wherein when the computer program is executed by a processor, to perform the session establishment method as claimed in claim 1.

14. A session establishment apparatus, comprising:
a request receiving module, configured to receive a session request from a user equipment (UE);
a forwarding module, configured to send the session request to a core network device;
a response receiving module, configured to receive a request response message returned by the core network device; wherein the request response message carries a session resource and a security key, and the session resource comprises an IP address allocated by the core network device to the UE and a Session Management Function (SMF) selected by the core network device for the UE;
a security activation module, configured to extract the session resource from the request response message, store the extracted session resource in a cache area, extract the security key from the request response message, and initiate a security activation of an access stratum to the UE based on the security key; and
a sending module, configured to send the session resources stored in the cache area to the UE after confirming that the security activation is successful, so that the UE establishes a session based on the session resource;
wherein the security activation module is further configured to configure a Data Radio Bearer (DRB) for the session and perform negotiation of access stratum security parameters.

* * * * *